United States Patent
Caswell

(10) Patent No.: US 9,351,477 B2
(45) Date of Patent: May 31, 2016

(54) LONG-WEAR EQUINE DIAGNOSTIC BOOT

(71) Applicant: Sharon Ann Caswell, Dallas, TX (US)

(72) Inventor: Sharon Ann Caswell, Dallas, TX (US)

( * ) Notice: Subject to any disclaimer, the term of this patent is extended or adjusted under 35 U.S.C. 154(b) by 0 days.

(21) Appl. No.: 14/458,774

(22) Filed: Aug. 13, 2014

(65) Prior Publication Data

US 2015/0047303 A1    Feb. 19, 2015

Related U.S. Application Data

(60) Provisional application No. 61/959,081, filed on Aug. 13, 2013.

(51) Int. Cl.
*A61D 9/00* (2006.01)
*A01K 13/00* (2006.01)

(52) U.S. Cl.
CPC .............. *A01K 13/007* (2013.01); *A61D 9/00* (2013.01)

(58) Field of Classification Search
CPC ......... A01K 13/007; A61D 9/00; A61D 9/02; A01L 7/02; A61B 5/022
USPC ................................. 54/82; 168/28; 119/850
See application file for complete search history.

(56) References Cited

U.S. PATENT DOCUMENTS

| | | | | |
|---|---|---|---|---|
| 5,363,632 | A * | 11/1994 | Armato | 54/82 |
| 6,682,497 | B2 * | 1/2004 | Jensen et al. | 602/27 |
| 7,967,766 | B2 * | 6/2011 | Ravikumar | 602/13 |
| 8,505,270 | B2 * | 8/2013 | D'Arpe | 54/82 |
| 2002/0104294 | A1 * | 8/2002 | Hainline | 54/44.5 |
| 2009/0288377 | A1 * | 11/2009 | Heid et al. | 54/82 |

* cited by examiner

*Primary Examiner* — Rob Swiatek
*Assistant Examiner* — Magdalena Topolski

(57) ABSTRACT

A long-wear equine diagnostic boot for use on the lower leg of a horse has a plurality of alignment ribs for locating a bladder against the horse's limb when the boot is secured to the horse's leg. An electronic diagnostic device retained and secured in the boot inflates the bladder upon activation to urge the bladder for engagement against the horse. The bladder transmits a signal via a pulse transmission tube to the electronic device. The boot is constructed of latex-free, breathable, lightweight, washable material which allows for safe, long-wearing of the boot.

2 Claims, 3 Drawing Sheets

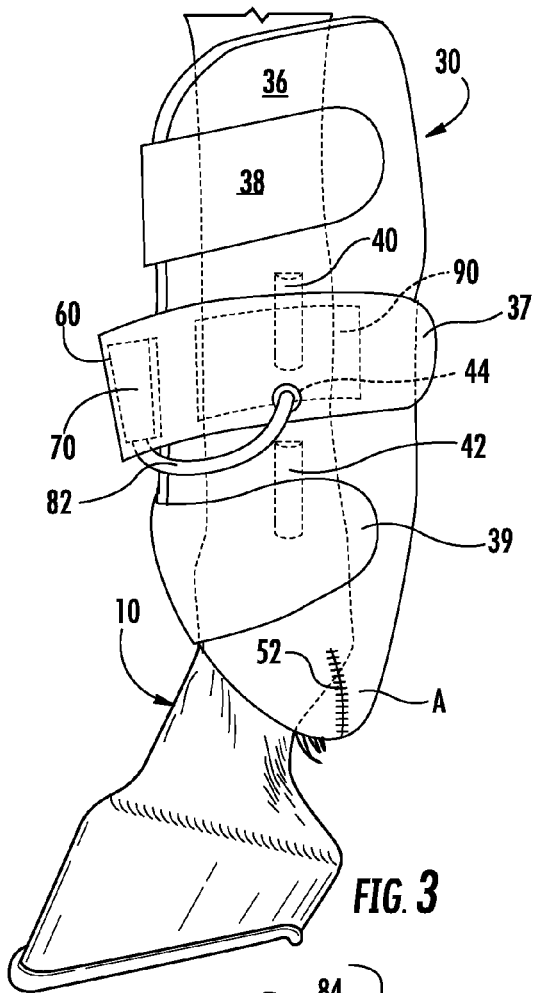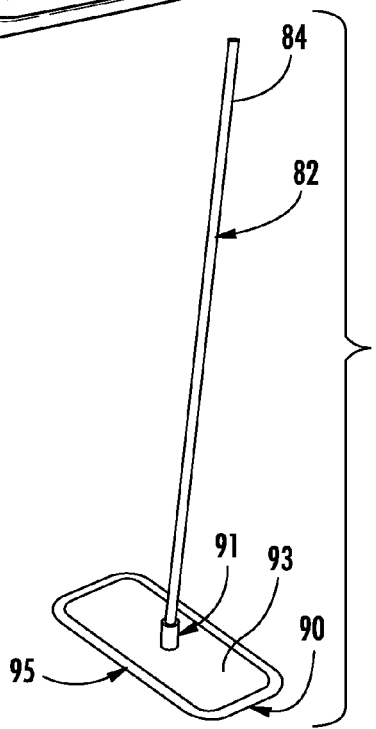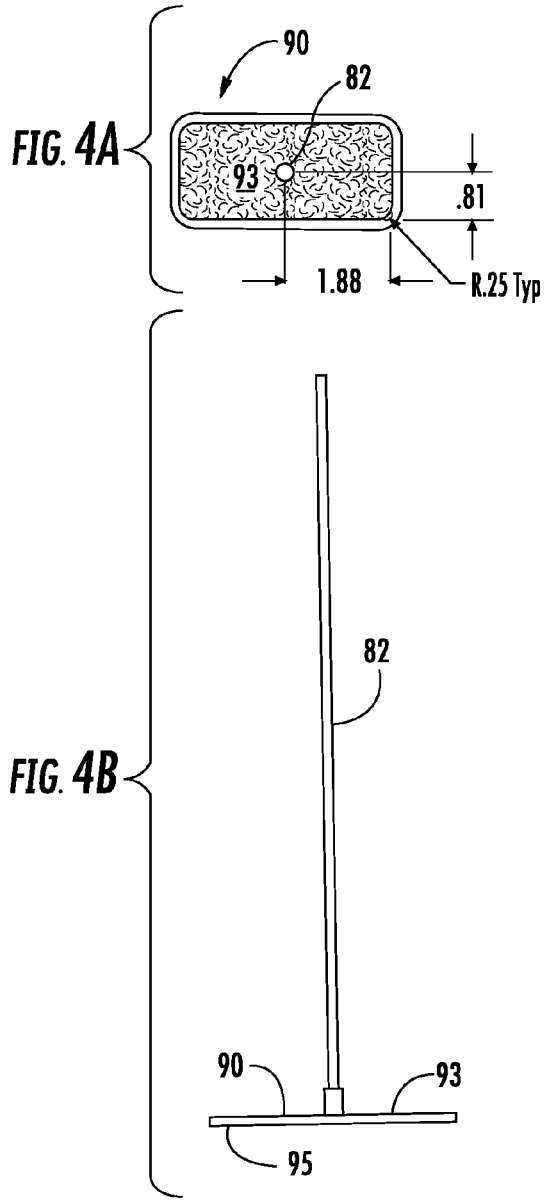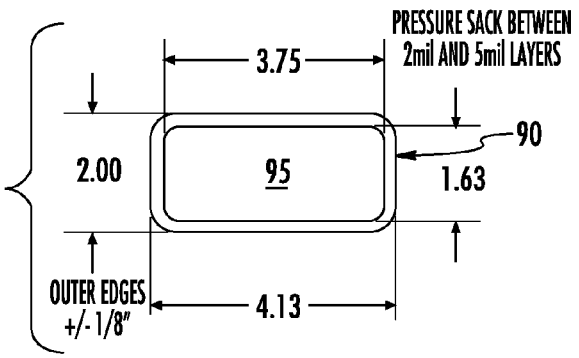

LONG-WEAR EQUINE DIAGNOSTIC BOOT

CROSS-REFERENCE TO RELATED APPLICATION

This application claims priority to U.S. Provisional Patent Application Ser. No. 61/959,081 filed Aug. 13, 2013, and incorporates the same into this specification for all purposes.

BACKGROUND

This present invention relates to equine boots. More particularly, the present invention relates to a long-wear equine diagnostic boot for the lower limbs of horses and, even more particularly, for use at the fetlock area of a horse. The fetlock is the common name for the metacarpolphalangeal and metatarsophalangeal joints (MCPJ and MTPJ) of horses, large animals, and sometimes dogs. It is the projection of the leg of a horse behind the joint between the cannon bone and great pastern bone, often bearing a tuft of hair.

Equine boots are described in various ways to indicate their specific uses. A variety of such boots include, but is not limited to, equilibrium stretch and flex flatwork leg wraps, all-purpose galloping boots, shipping boots, single lock brushing boots, dressage sports boots, therapeutic no-bow wraps, etc. The present invention is a boot designed specifically to monitor and diagnose physiological conditions of the horse over an extended time period. Thus, it is referred to as a diagnostic boot.

The boot is designed to retain and secure a variety of wireless electronic devices. These devices may monitor and gather data such as pulse, pulse pressure, blood pressure, hydration, respiration, blood volume and hemorrhaging for diagnostic purposes. The devices also slave up to other devices, such as a temperature patch and pulse oximeter. The devices may be non-invasive and wireless physiological monitoring systems. They may be powered by lithium polymer batteries and include a high accuracy pressure sensor, an ARM processor, a flash memory and blue tooth communication (Bluetooth transceiver).

The prior art for horse boots is extensive and includes U.S. Pat. Nos. 8,443,763; 6,918,236; 5,579,627; 5,441,015; 5,363,632; 4,420,411; and 2,194,921. This prior art teaches and discloses flexible wraps and boots which support and restrict movement at the fetlock joint.

Most current equine boots are manufactured of dressing materials which hold heat and moisture against the horse's leg which may cause injury to the horse. The present invention is designed not only to secure and retain an electronic diagnostic device but also be designed for extended wear through the use of breathable, lightweight, and washable materials. This present invention provides fixed alignment ribs for disposition proximally along the outside of the deep digital flexor tendon in the groove formed in the horse's leg. This allows for enhanced capture of the digital pulse for use in diagnosis and for maintaining alignment of the electronic diagnosis device during use. The prior art does not teach the features and elements of the present invention.

SUMMARY

The present invention provides a long-wear equine diagnostic boot which securely holds and retains a wireless electronic diagnostic apparatus on the horse's lower leg while protecting the horse's leg from heat retention. The invention utilizes fabrics that may be worn on the horse's leg for prolonged periods without sliding and chaffing the animal's skin during the horse's daily activities. A pneumatic bladder in contact with the horse's limb transmits a pulse to the electronic diagnostic device via a tube extending from the bladder to the electronic device. Alignment ribs ensure proper disposition of the boot on the horse's leg. Boot construction materials are easily washable and dried for repeated usage.

BRIEF DESCRIPTION OF THE DRAWINGS

FIG. 3 shows the boot wrapped securely about a horse's lower leg with the cup section of the fitted heel portion covering the fetlock of the horse and the electronic diagnostic device disposed within the mesh pocket of the central closure strap.

FIG. 4 is a top side perspective view of the bladder of the present diagnostic boot with the pulse transmission tube attached to the bladder.

FIG. 4A is a top plan view of the bladder of FIG. 4.

FIG. 4B is a side elevation view of the bladder of FIG. 4.

FIG. 4C is a bottom plan view of the bladder of FIG. 4.

DETAILED DESCRIPTION

Figure 1:
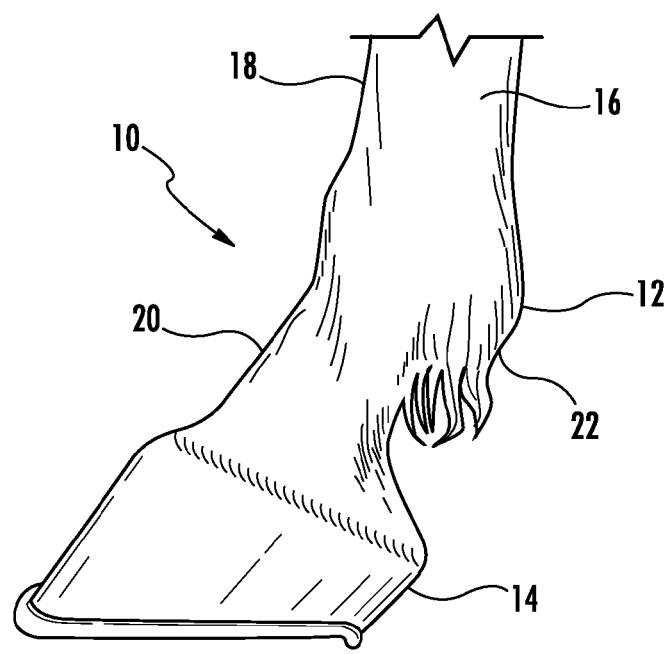
FIG. 1 illustrates the lower portion of a horse's leg showing the fetlock and the longitudinal groove extending along the outer side of the horse's leg proximal the deep digital flexor tendon.

Turning now to the drawings, FIG. 1 illustrates the lower portion 10 of a horse's leg showing the fetlock joint 12, the hoof 14 and the groove 16 extending longitudinally and downward proximal the deep digital flexor tendon. The front portion 18 of the leg 10 is forward the cannon bone. The long pastern bone and the short pastern bone are located in the lower most portion 20 of the leg above the coffin bone and hoof The rear of the leg 22 curves forward below the fetlock joint and this facilitates the fitting of a heel portion of the present diagnostic boot to conform to the joint area.

Figure 2:
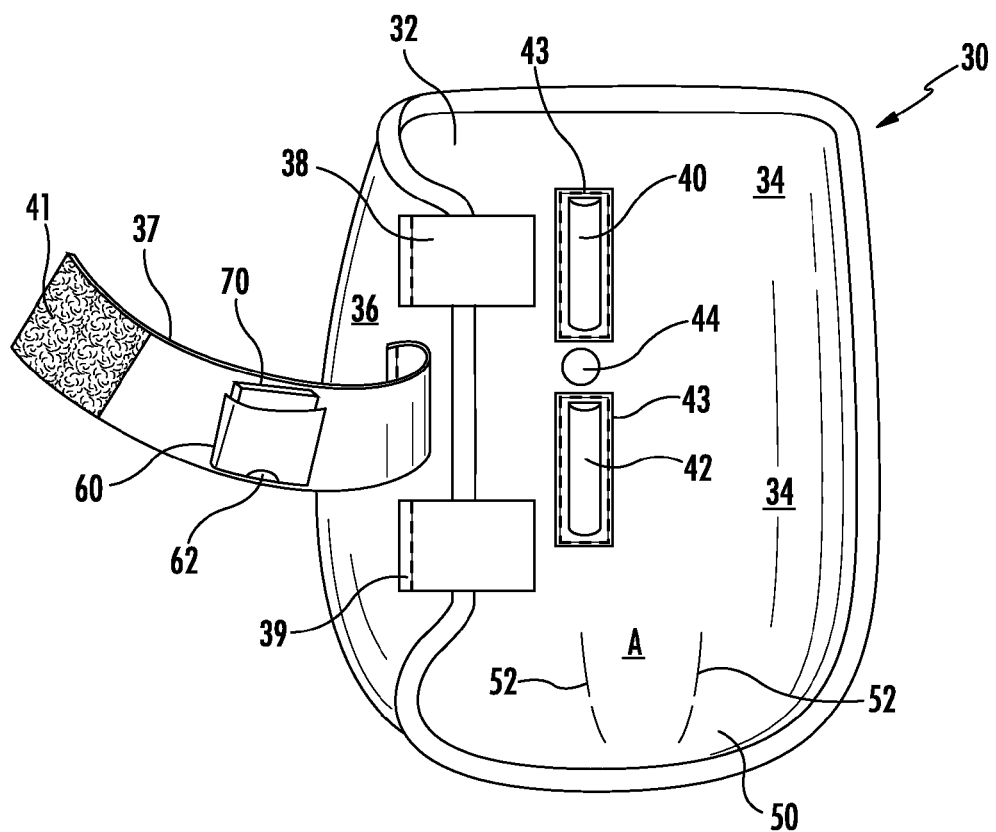
FIG. 2 illustrates a side elevation view of the diagnostic boot showing the inner surface of the boot with the left edge partially folded for closure of the boot.

FIG. 2 illustrates a side elevation view in partial perspective of the boot 30. A foldable, flexible, latex-free wicking fabric panel 32 has a two-sided (dual laminated) soft surface. The inner surface 34 is shown in FIG. 2. Both the inner surface 34 and the outer surface 36 are covered with the soft loop portion of a "hook-and-loop" fastener fabric.

The panel 32 has three separate closure straps 37, 38, and 39 securely attached to the outer surface 36 of the panel. Upper 38 and lower 39 straps shown in FIG. 2 are only shown partially to provide a clearer illustration. It should be understood that straps 38 and 39 are of sufficient length to wrap around to the rear, outer surface 35 (FIG. 2B) when the panel is closed around the horse's leg. The straps 38 and 39 have hook fastener portions on distal ends of the straps for engagement and attachment to the soft loop surface of the panel when the panel is wrapped to form the boot on the horse's leg.

The inner surface 34 of panel 32 is provided with two vertically aligned, spaced-apart, longitudinal ribs 40 and 42. Each rib is a short length of rubber or polyurethane tubing (non-metallic) approximately ½ inches in length. Each tubing section is covered with latex-free neoprene fabric member 43 slightly larger than the tubing sections to enable the tubing to be covered so as to affix the ribs to the inner surface of the panel. Normally the covered ribs will be sewn onto the fabric panel 32, but other fastening methods may be utilized (such as gluing).

The ribs 40 and 42 are spaced apart approximately 1 ¾"-2" and project inwardly from the inner surface 34. In the space between the ribs, and in longitudinal alignment, is a pass through hole 44 sized to allow a ⅛ inch pulse transmission tube to pass there through as will be explained below.

Near the lower margin 50 of the panel 30 several darts or pleats 52 are formed in the panel 30. The panel 30 has, by virtue of these stitched pleats, a concave-convex or cup-like section A adjacent the lower margin to receive and comfortably accommodate the horse's fetlock joint. Thus, area A between pleats 52 forms an indented pocket or cup portion for accommodating the ankle of the horse. The use of the pleats or darts avoids the problem of wrinkling at the base of the ankle and provides a deep pocket to conform to the ankle joint.

FIG. 2 also discloses a central closure strap 37 disposed between straps 38 and 39. Central strap 37 is securely attached, by stitching or the like, to the outer soft loop surface 36 of the boot 30. The central strap 37 is a dri-cut piece of latex-free neoprene approximately 11-12" long and 3" wide with a hook fastener portion 41 sewn on the inside, distal end of the strap.

A mesh pocket 60 measuring approximately 3-3 ½ inches× 2-2 ½ inches is sewn on the inner surface of the strap 37. This pocket 60 is sized to securely hold and retain a wireless electronic diagnostic device 70. The pocket 60 has a pulse transmission tubing opening 62 in the bottom adapted to receive a second end 84 of the pulse transmission tubing 82 running from a pulse bladder 90, as well as described further below, to the electronic device 70.

Figure 2A:
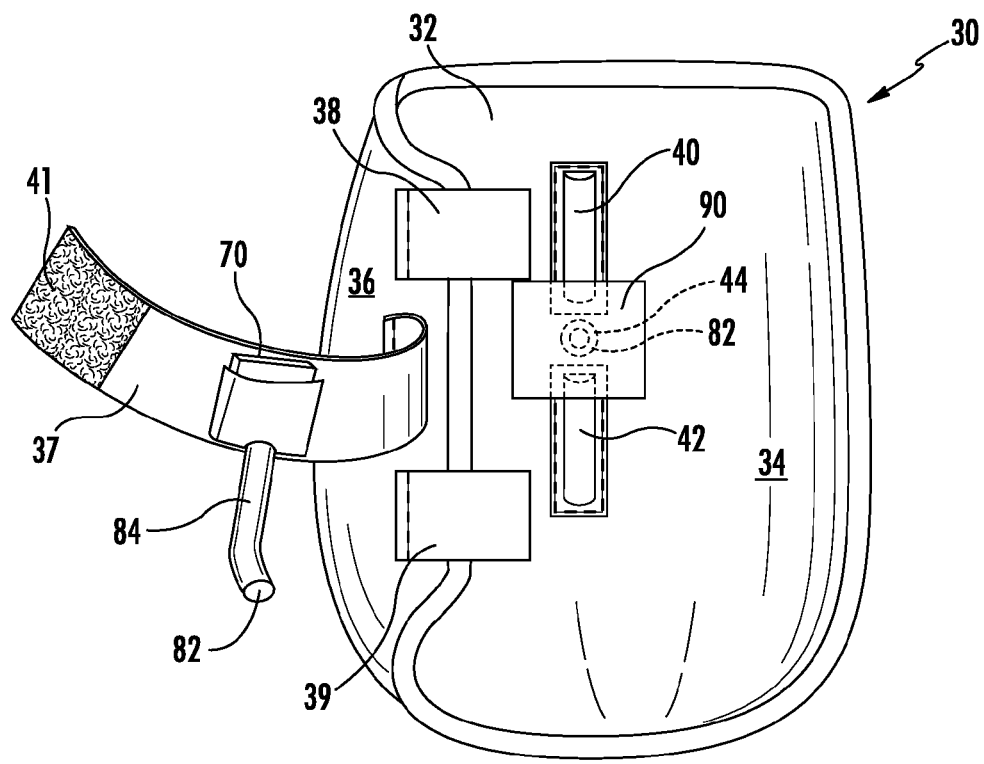
FIG. 2A illustrates the boot of FIG. 2 showing the placement of the bladder over the through hole and the alignment ribs and showing the distal end of the pulse transmission tube attached to the electronic device in the pocket.

In FIG. 2A, it may be seen that a pulse bladder 90 has been disposed over the ribs 40 and 42 and the pass through hole 40. The bladder 90 will be described in detail below. Because the pneumatic bladder 90 overlays the ribs 40 and 42, when the panel 32 is wrapped about and secured to the horse's lower leg with the ribs aligned within the groove 16 in the horse's leg, the bladder will be urged into contact with the surface of the horse's leg. This engagement and contact is further enhanced when the electronic device 70 is activated and inflates the bladder to a low pressure that does not restrict blood flow.

Figure 2B:
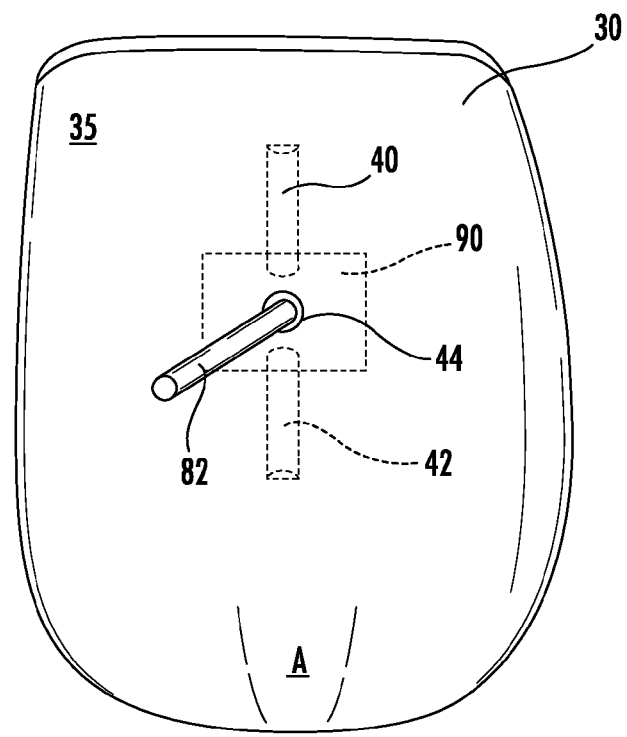
FIG. 2B shows the rear outside surface of the boot of FIG. 2A with the pulse transmission tube passing through the hole in the body of the boot.

FIG. 2B illustrates the rear, outer surface 35 of the boot 30 showing how the pulse transmission tub 82 passes through hole 44 and extends around to the front of the boot and is connectable to the underside of the electronic device 70 (FIG. 2A).

FIG. 3 illustrates how the diagnostic boot 30 may be fitted to the horse's lower leg 10. Once the bladder 90 is secured to the inner surface 34 by the hook portion of material 93 on the top of the bladder 90, it overlaps the ribs 40 and 42.

The tube 82 is passed through hole 44 and extends to the outside of the boot. This tube will be connected to the electronic device 70 in the pocket 60 on the inside of the central strap 37.

The boot 30 is placed on the horse's leg such that the ribs 40 and 42 align with the groove 16 in the horse's leg. The panel 32 is wrapped around the horse's leg and tightened against the leg by the upper and lower strap 38 and 39. The cup section A of the boot conforms to the fetlock joint.

Next, the distal end 84 of tube 82 is passed through hole 62 in the mesh pocket 60 on the inside of the central strap 37 and is connected to the electronic device 70.

The central strap 37 is pulled tightly around the outer surface 36 of the panel 32 securing the device 70 at the front side of the horse's leg proximal to pastern bone. Upon activation of the electronic device, the bladder 90 is inflated ensuring contact of the natural urethane bottom 95 of the bladder 90 with the horse's leg. The electronic diagnostic device 70 senses the pulse from the bladder and compiles physiological data from it.

Turning to FIGS. 4-4C, the pulse bladder 90 is shown. In FIG. 4, the bladder 90 is shown with a straight urethane connector 91 attaching a length of flexible pulse transmission tubing 82 (⅛" OD×1/16" ID×12" long). The top surface 93 is a sealable hook portion of material for attaching the bladder 90 over the ribs 40 and 42 and against the inner surface 34 of the panel 32 with the tube 82 passing through hole 44 (See FIG. 2A). The bottom surface 95 of the bladder 90 is a 2 mil piece of natural urethane which is bonded and sealed to the hook portion of material 93 to form the bladder 90.

Although the disclosed subject matter and its advantages have been described in detail, it should be understood that various changes, substitutions and alterations can be made herein without departing from the invention as defined by the appended claims. Moreover, the scope of the claimed subject matter is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

I claim:

1. An equine diagnostic boot for use on the lower leg of a horse comprising:
   a latex-free two-sided soft surface flexible panel member, said panel member having an inner surface and an outer surface;
   a plurality of generally vertical, elongated, spaced apart ribs attached to said inner surface of said panel member;
   a pass through hole in said panel disposed between said spaced apart ribs;
   a plurality of attachment straps affixed to said outer surface of said flexible panel member, said straps having hook fastener positioned on distal ends for cooperating with said soft outer surface of said panel to secure said panel around said lower leg of said horse;
   a wireless electronic diagnostic devices for sensing and transmitting physiological data relating to said horse;
   a central attachment strap affixed to said outer surface of said flexible panel member, said central strap having a pocket on an inner surface of said strap for retaining said wireless electronic diagnostic device; said central strap having a hook fastener portion on a distal end for cooperating with said soft outer surface of said panel to secure said panel around said lower leg of said horse and to secure said wireless electronic diagnostic device in said pocket;
   a bladder member having a first surface of a hook fastener material releasably attachable over said ribs and said pass through hole, said bladder member having a second surface of urethane sealingly bonded to said first surface to form a sealed bladder, said bladder having a pulse transmission tube sealingly connected at a first end to and in fluid communication with said bladder, said tube releasably connectable at a second end to said electronic diagnostic device, said bladder member urged into a groove extending longitudinally and downward proximal said horses' digital flexor tendon by said spaced apart ribs when said flexible panel is secured around said lower leg of said horse, said bladder inflatable upon activation of said wireless electronic diagnostic device to further urge said bladder into said groove to sense and transmit pulses from said bladder to said wireless electronic diagnostic device through said pulse transmission tube.

2. An equine diagnostic boot for use on the lower leg of a horse comprising:
- a flexible panel member, said panel member having an inner surface and an outer surface;
- a plurality of generally vertical, elongated, spaced apart ribs attached to said inner surface of said panel member;
- a pass through hole in said panel disposed between said spaced apart ribs;
- a wireless electronic diagnostic device for sensing and transmitting physiological data relating to said horse;
- a central attachment strap affixed to said outer surface of said flexible panel member, said central strap having a pocket on an inner surface of said strap for retaining said wireless electronic diagnostic device; said central strap having a fastener portion on a distal end for cooperating with said outer surface of said panel to secure said panel around said lower leg of said horse and to secure said wireless electronic diagnostic device in said pocket; and
- a sealed bladder member releasably attachable over said ribs and said pass through hole, said bladder having a pulse transmission tube sealingly connected at a first end to and in fluid communication with said bladder, said tube releasably connectable at a second end to said electronic diagnostic device, said bladder member urged into a groove extending longitudinally and downward proximal said horses' digital flexor tendon by said spaced apart ribs when said flexible panel is secured around said lower leg of said horse, said bladder inflatable upon activation of said wireless electronic diagnostic device to further urge said bladder into said groove to sense and transmit pulses from said bladder to said wireless electronic diagnostic device through said pulse transmission tube.

* * * * *